(12) United States Patent
Manepalli et al.

(10) Patent No.: US 11,575,671 B2
(45) Date of Patent: *Feb. 7, 2023

(54) NETWORK ID DEVICE HISTORY AND MOBILE ACCOUNT ATTRIBUTES USED AS A RISK INDICATOR IN MOBILE NETWORK-BASED AUTHENTICATION

(71) Applicant: ZUMIGO, INC., San Jose, CA (US)

(72) Inventors: Harish Manepalli, San Jose, CA (US); Chirag C. Bakshi, San Jose, CA (US); Venkatarama Parimi, Dublin, CA (US); Lyndi Rebecca Long, Plant City, FL (US)

(73) Assignee: ZUMIGO, INC., San Jose, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/442,323

(22) Filed: Jun. 14, 2019

(65) Prior Publication Data
US 2020/0244656 A1    Jul. 30, 2020

Related U.S. Application Data

(63) Continuation-in-part of application No. 16/262,811, filed on Jan. 30, 2019.

(51) Int. Cl.
*H04L 9/40*    (2022.01)
*H04W 12/06*    (2021.01)
*G06F 16/953*    (2019.01)

(52) U.S. Cl.
CPC ........ *H04L 63/0876* (2013.01); *G06F 16/953* (2019.01); *H04L 63/102* (2013.01); *H04L 63/1433* (2013.01); *H04W 12/06* (2013.01)

(58) Field of Classification Search
CPC ............... H04L 63/0876; H04L 63/102; H04L 63/1433; G06F 16/953; H04W 12/06
(Continued)

(56) References Cited

U.S. PATENT DOCUMENTS 7,298,327 B2    11/2007  Dupray et al.
7,373,515 B2    5/2008   Owen et al.
(Continued)

FOREIGN PATENT DOCUMENTS

WO       2016/050990 A1    4/2016
WO    WO-2016050990 A1 *   4/2016  ......... H04L 63/1458
WO       2018/227024 A1    12/2018

OTHER PUBLICATIONS

Marforio et al. "Smartphones as Practical and Secure Location Verification Tokens for Payments," NDSS 2014, Feb. 22, 2014, 15 pages.

(Continued)

*Primary Examiner* — Mohammad W Reza
*Assistant Examiner* — Moeen Khan
(74) *Attorney, Agent, or Firm* — Kim & Stewart LLP

(57) ABSTRACT

An authorization process employs a network ID as a possession factor for a secure account, such as a bank account or e-mail account, and determines one or more risk indicators associated with the possession factor. The authorization process is successfully completed when a risk score that is based on the risk indicators is less than a certain risk threshold. The risk indicators include a device history of the network ID and/or at least one attribute of a cellular account associated with the network ID. The device history identifies other mobile devices and/or SIM cards, if any, that have been previously activated with the network ID, while the one or more attributes can further indicate potentially fraudulent activity associated with the cellular account through which wireless services for the network ID are currently provided.

12 Claims, 5 Drawing Sheets

(58) Field of Classification Search
USPC .......................................................... 726/4
See application file for complete search history.

(56) References Cited

U.S. PATENT DOCUMENTS

| | | | |
|---|---|---|---|
| 7,640,574 B1 | 12/2009 | Kim et al. | |
| 8,020,763 B1 | 9/2011 | Kowalchyk et al. | |
| 8,255,517 B1* | 8/2012 | Hernacki | H04W 76/00 |
| | | | 709/224 |
| 10,560,845 B1 | 2/2020 | Manepalli et al. | |
| 2001/0037451 A1 | 11/2001 | Bhagavatula et al. | |
| 2002/0091745 A1 | 7/2002 | Ramamurthy et al. | |
| 2004/0225880 A1 | 11/2004 | Mizrah | |
| 2005/0268107 A1 | 12/2005 | Harris et al. | |
| 2006/0070125 A1 | 3/2006 | Pritchard et al. | |
| 2006/0136740 A1 | 6/2006 | Smith et al. | |
| 2007/0033649 A1 | 2/2007 | Henriksen | |
| 2010/0299748 A1* | 11/2010 | Johansson | G06F 21/64 |
| | | | 726/19 |
| 2011/0122813 A1* | 5/2011 | Choe | H04W 12/126 |
| | | | 370/328 |
| 2011/0165892 A1 | 7/2011 | Ristich et al. | |
| 2011/0231914 A1 | 9/2011 | Hung | |
| 2011/0270748 A1* | 11/2011 | Graham, III | G06Q 40/00 |
| | | | 705/40 |
| 2012/0276924 A1* | 11/2012 | Li | H04W 4/029 |
| | | | 455/456.2 |
| 2014/0229388 A1 | 8/2014 | Pereira et al. | |
| 2014/0279544 A1 | 9/2014 | Baird et al. | |
| 2015/0135292 A1 | 5/2015 | Lee | |
| 2016/0014603 A1 | 1/2016 | Woodward et al. | |
| 2016/0021532 A1* | 1/2016 | Schenk | H04B 1/3816 |
| | | | 455/558 |
| 2016/0086184 A1* | 3/2016 | Carpenter | G06Q 20/4016 |
| | | | 705/44 |
| 2018/0054512 A1 | 2/2018 | Kurita et al. | |
| 2018/0166176 A1 | 6/2018 | Flippen et al. | |
| 2018/0219891 A1 | 8/2018 | Jain | |
| 2018/0359244 A1* | 12/2018 | Cockerill | H04L 63/0876 |
| 2019/0139024 A1 | 5/2019 | Bakshi et al. | |

OTHER PUBLICATIONS

International Search Report and Written Opinion dated May 20, 2020 in International Application No. PCT/US2020/015274, 13 pages.
International Search Report and Written Opinion dated Apr. 6, 2020 in International Application No. PCT/US2019/065230, 9 pages.

* cited by examiner

141 ↘

| Network ID 201 | Cellular Account 202 | Account Tenure 203 | Payment Status 204 | Account Payment Type 205 | Pre-Paid Transition Status 206 | Call Forwarding Activation 207 | Call Forwarding Recency 208 | Network ID Porting Status 209 |
|---|---|---|---|---|---|---|---|---|
| XXX-YYY-ZZZ1 | 236-254 | 34 days | Late | Pre-Paid | 2019.04.08 | N/A | N/A | 2019.04.08 |
| XXX-YYY-ZZZ2 | 158-358 | 1 days | OK | Billed | N/A | N/A | N/A | N/A |
| XXX-YYY-ZZZ3 | 115-842 | 255 days | OK | Billed | N/A | N/A | N/A | N/A |
| XXX-YYY-ZZZ4 | 28-863 | 377 days | OK | Billed | N/A | YES | 2019.03.15 | N/A |
| XXX-YYY-ZZZ5 | 587-984 | 653 days | Late | Billed | N/A | N/A | N/A | N/A |
| XXX-YYY-ZZZ6 | 222-357 | 568 days | OK | Pre-Paid | 2018.09.02 | N/A | N/A | N/A |
| XXX-YYY-ZZZ7 | 236-254 | 45 days | Collections | Billed | N/A | N/A | N/A | 2019.04.11 |
| XXX-YYY-ZZZ8 | 245-358 | 234 days | Late | Billed | N/A | YES | 2019.09.02 | 2017.09.02 |
| XXX-YYY-ZZZ9 | 257-355 | 0 days | OK | Pre-Paid | 2019.04.11 | YES | 2019.04.11 | 2019.04.11 |
| XXX-YYY-ZZ10 | 287-254 | 3 days | OK | Billed | N/A | N/A | N/A | N/A |
| XXX-YYY-ZZ11 | 891-358 | 0 days | OK | Pre-Paid | 2019.04.11 | N/A | N/A | N/A |

| | MOBILE NUMBER 201 | MOBILE DEVICE ID 302 | ACTIVATION DATE 303 | SIM CARD ID 304 | ACTIVATION DATE 305 |
|---|---|---|---|---|---|
| 310 | XXX-YYY-ZZZ1 | XXXXXXXXXXXXXX11 | 2016.01.02 | YYYYYYYYYYYYYYY11 | 2016.01.02 |
| | | XXXXXXXXXXXXXX12 | 2017.04.10 | YYYYYYYYYYYYYYY12 | 2017.04.10 |
| | | XXXXXXXXXXXXXX13 | 2018.09.17 | YYYYYYYYYYYYYYY13 | 2018.09.17 |
| | | XXXXXXXXXXXXXX14 | 2018.09.18 | YYYYYYYYYYYYYYY14 | 2018.09.18 |
| | | XXXXXXXXXXXXXX15 | 2018.09.20 | YYYYYYYYYYYYYYY15 | 2018.09.20 |
| 320 | XXX-YYY-ZZZ2 | XXXXXXXXXXXXXX21 | 2016.09.02 | YYYYYYYYYYYYYYY21 | 2016.09.02 |
| | | XXXXXXXXXXXXXX22 | 2017.02.02 | YYYYYYYYYYYYYYY22 | 2017.02.02 |
| | | XXXXXXXXXXXXXX23 | 2017.02.02 | YYYYYYYYYYYYYYY22 | 2017.02.02 |
| | | XXXXXXXXXXXXXX24 | 2017.03.10 | YYYYYYYYYYYYYYY22 | 2017.03.10 |
| | | XXXXXXXXXXXXXX25 | 2018.09.02 | YYYYYYYYYYYYYYY24 | 2018.09.02 |
| 330 | XXX-YYY-ZZZ3 | XXXXXXXXXXXXXX31 | 2016.02.01 | YYYYYYYYYYYYYYY31 | 2016.02.01 |
| | | XXXXXXXXXXXXXX32 | 2017.02.01 | YYYYYYYYYYYYYYY31 | 2017.02.01 |
| | | XXXXXXXXXXXXXX33 | 2018.02.01 | YYYYYYYYYYYYYYY31 | 2018.02.01 |
| | ... | ... | ... | ... | ... |

FIG. 3

NETWORK ID DEVICE HISTORY AND MOBILE ACCOUNT ATTRIBUTES USED AS A RISK INDICATOR IN MOBILE NETWORK-BASED AUTHENTICATION

CROSS-REFERENCE TO RELATED APPLICATION(S)

This application is a continuation-in-part of U.S. patent application Ser. No. 16/262,811, filed Jan. 30, 2019, the entire contents of which are incorporated by reference herein.

BACKGROUND OF THE INVENTION

Field of the Invention

Embodiments of the present invention generally relate to wireless telecommunication systems and, more specifically, to systems and methods using network ID device history and mobile account attributes as a risk indicator in mobile network-based authentication.

Description of the Related Art

It has become common practice for possession of a mobile device to be employed as an authentication factor for login to an account or website associated with sensitive information. For example, when logging in to a bank account via an application on a mobile device or other computing device, a user may be required to confirm possession of the mobile device that is linked to the bank account. In some instances, possession is verified when the user enters a one-time password (OTP) that is sent via text message to the authorized mobile device. Alternatively, when a user attempts to access a bank account via a mobile device, access may be restricted to the mobile device that is linked to the bank account. In such instances, technologies are employed that determine the network identification (ID) of the mobile device interacting with an application or website and report the network ID to the bank. Thus, the bank can confirm that the bank account is being accessed by the authorized mobile device.

One drawback to using possession of a mobile device as an authentication factor is that a network ID can be disassociated from one mobile device and associated with another mobile device. This can be problematic when the network ID is the means by which banks and other authentication entities identify specific mobile devices. For example, a network ID is typically linked to a specific subscriber identification module (SIM), or SIM card, and not to a specific mobile device. Thus, by transferring a SIM card to a different mobile device, the network ID linked to the SIM card can be associated with a different mobile device. Further, network ID is not permanently linked to a single SIM card, and instead can be reassigned by a cellular network operator to another SIM card. This is commonly done when a user of a mobile device activates a previously used network ID on a mobile device that requires a different SIM card, such as when the user changes to a different cellular network operator. In light of the above, if a fraudster can convince a cellular network operator to activate a victim's network ID on a mobile device of the fraudster, the fraudster can employ the fraudster mobile device as an authentication factor for accessing any restricted-access account of the victim that uses the victim's network ID as an authentication factor.

SUMMARY OF THE INVENTION

According to one or more embodiments, the device history of a mobile telephone number, or "network ID," is tracked to facilitate detection of risk associated with the network ID by an application server or other authentication entity. In addition to or in the absence of timely device history information for the network ID, one or more attributes of a cellular account associated with the network ID are reviewed for risk indicators associated with the cellular account. Thus, when access to a secure account that is linked to a network ID is requested from a computing device, certain risk indicators can be determined based on the tracked device history of the network ID and/or on the one or more attributes of the cellular account associated with the network ID. As a result, fraudulent activity associated with the network ID can be detected, and use of the network ID as an indicator of possession of a particular mobile device is more secure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 shows a cellular account database, according to one or more embodiments of the present invention.

FIG. 3 shows a device history database, according to one or more embodiments of the present invention.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
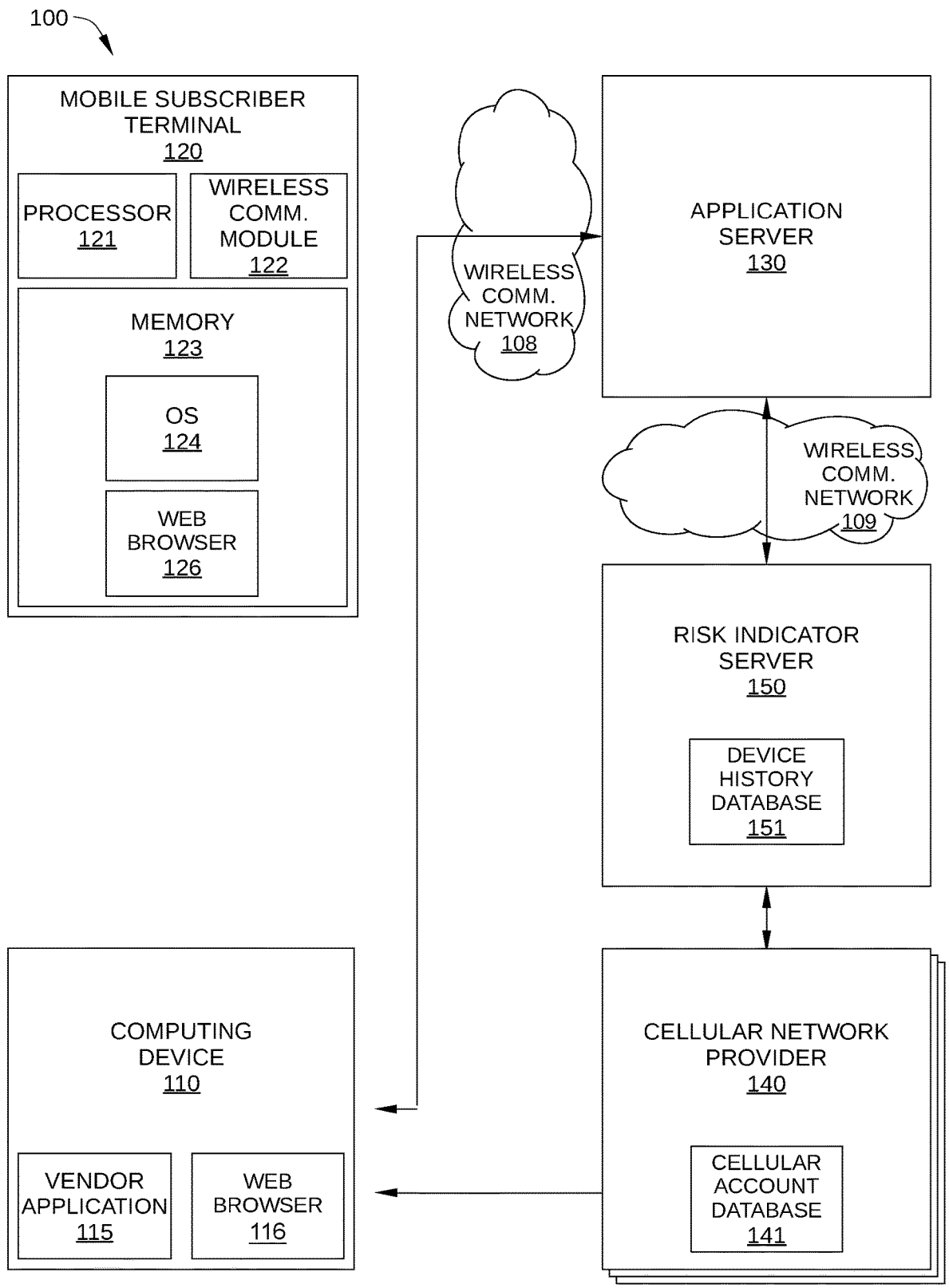
FIG. 1 is a block diagram of a mobile identity verification system, according to one or more embodiments of the present invention.

FIG. 1 is a block diagram of a mobile identity verification system 100, according to one or more embodiments of the present invention. As described below, in a mobile network-based authentication process that employs a network identification (ID) as an authentication factor, mobile identity verification system 100 enables the device history of the network ID and/or attributes of the cellular account associated with the network ID to be used as risk indicators. Consequently, the reliability and security of using the network ID as an authentication factor is enhanced.

In some embodiments, one or more risk indicators are based on information included in a tracked history of cellular devices that have been previously activated with a particular network ID and/or when each such cellular device was activated with the network ID. Alternatively or additionally, in some embodiments, one or more risk indicators are based on information included in a tracked history of subscriber identification module (SIM) cards that have been previously associated with the network ID of interest and/or when each such SIM card was associated with the network ID. Further, in addition to or in the absence of the history of cellular devices that have been previously activated with the network ID of interest and/or the history of SIM cards that have been previously associated with the network ID of interest, attributes of the cellular account through which wireless services for the network ID are currently provided are reviewed as potential risk indicators. For example, such attributes of the cellular account that are reviewed as potential risk indicators can include how recently the cellular account was opened, whether payments for the cellular account are currently in arrears, whether the cellular account is a prepaid account, whether call-forwarding has been activated on the cellular account, whether the network ID has been ported from a different cellular account or cellular provider, and the like.

The above-described risk indicators inform an application server or other authentication entity whether the network ID reliably indicates possession of a particular mobile device. For example, in some embodiments, a user initiates a user activity with a computing device, such as logging in to a secure account or otherwise requesting authorized access to an application server or restricted access computing device. In such embodiments, the application server enables access to the secure account or otherwise authorizes the user activity based on 1) the network ID of a mobile device linked to the secure account and 2) a device history of the network ID and/or one or more attributes of the cellular account associated with the network ID.

Mobile identity verification system 100 includes a computing device 110, a mobile device 120 (such as a cellular telephone or smartphone), an application server 130, a cellular network provider 140, and a risk indicator server 150. Computing device 110 is communicatively coupled to application server 130 by a communication network 108 and application server 130 is communicatively coupled to risk indicator server 150 by a communication network 109. Communication network 108 and communication network 109 can each include a wireless local area network (WLAN), a cellular network, a wired communication network, or any combination thereof. Furthermore, while computing device 110 is shown in FIG. 1 to be communicatively coupled to application server 130 by communication network 108 and to risk indicator server 150 by communication network 109, in other embodiments, one or more additional communication networks may also be employed to communicatively couple computing device 1110, application server 130, and risk indicator server 150, such as the Internet, among others.

The WLAN included in communication network 108 and/or communication network 109 enables compatible devices to connect to the Internet via a wireless access point, or "hotspot." For example, in some embodiments, the WLAN is a WiFi network that includes one or more devices based on the Institute of Electrical and Electronics Engineers (IEEE) 802.11 standard. Thus, any suitably configured wireless communication device that can connect to the WLAN, such as a smartphone with WiFi capability, can perform data transfer to and from the Internet. The cellular network included in communication network 108 and/or communication network 109 enables two-way wireless communication with wireless subscriber terminals, such as mobile device 120. For example, in some embodiments, the cellular network includes one or more base stations (not shown) that are in two-way wireless communication with wireless subscriber terminals, and with a landline system (not shown), such as the public switched telephone network (PSTN) or any other wired network capable of voice/data connections. When an active call associated with mobile device 120 is underway in the cellular network, a suitable base station translates a forward trunk signal in the landline system to a properly formatted radio signal, which is transmitted by an antenna to mobile device 120 over an air interface. Mobile device 120 performs complementary operations to enable the two-way voice or data traffic over the air interface.

Computing device 110 can be any technically feasible and network-connected computing device. For example computing device 110 can be a desktop computer, laptop computer, smartphone, personal digital assistant (PDA), tablet computer, or any other type of computing device that is configured to receive input, process data, and display images, and is suitable for practicing one or more embodiments of the present invention. Thus, computing device 110 is configured to execute a vendor application 115, a web browser 116, and/or other software applications. In addition, computing device 110 is configured to communicate with application server 130, for example via a web browser 116.

Vendor application 115 is a computer program designed to run on computing device 110. Vendor application 115 is loaded on computing device 110 and facilitates interactions with a particular website, such as application server 130, a particular database, or some other computing device. For example, in some embodiments, vendor application 115 is a banking application, a navigational program, an application that facilitates online purchasing of entertainment media from a specific website, etc.

Mobile device 120 can be a cellular telephone (also referred to as a wireless subscriber terminal), a smart phone, a personal digital assistant (PDA), a tablet computer, or any other mobile computing device configured to wirelessly access communication network 108 and communication network 109, and to practice one or more embodiments of the present invention. To that end, in some embodiments, mobile device 120 includes a processor 121, a wireless communication module 122, and a memory 123. Processor 121 may be any suitable processing unit implemented as a central processing unit (CPU), an application-specific integrated circuit (ASIC), a field programmable gate array (FPGA), any other type of processing unit, or a combination of different processing units. Wireless communication module 122 may be any suitable electronics package and or chipset configured to enable wireless communication with communication network 108 and communication network 109. Thus, in some embodiments, wireless communication module 122 includes cellular capability and WiFi capability, among others. Alternatively or additionally, in some embodiments, wireless communication module 122 includes Bluetooth capability. Memory 123 can include any suitable volatile and/or nonvolatile memory (e.g., random-access memory (RAM), read-only memory (ROM), flash memory, a magnetic hard drive, etc.), and is configured to store instructions, data, an operating system (OS) 124, and/or a web browser 126, etc.

OS 124 supports the functions of processor 121, including scheduling tasks and sending commands to memory 123 and wireless communication module 122, managing the power state of mobile device 120, initiating execution of applications on processor 121, managing sockets and TCP connections, and the like. For example, in some embodiments, OS 124 is configured to facilitate the execution of web browser 126, and/or other software applications. In some embodiments, computing device 110 and mobile device 120 can be the same computing device. In such embodiments, mobile device 120 can be used to initiate a sensitive transaction with application server 130, and possession of mobile device 120 can be used as an authentication factor for the sensitive transaction.

Application server 130 can be any entity that can be accessed by mobile device 120 via a WiFi network and can benefit from identification and/or authorization of a user prior to access by the user. More specifically, application server 130 can be any entity that provides access to a vendor website or to sensitive information. Alternatively or additionally, application server 130 enables important data and/or financial transactions. Application server 130 can be implemented as a website, an application, a server, a database, an application running on an instance of virtual machine, and the like. Thus, in some embodiments, application server 130 is a public or open server, whereas in other embodiments, application server 130 is a restricted access only server. For example, in some embodiments, application server 130 can be a restricted access server, a merchant server, a vendor website, an e-mail server or application that enables interaction with an e-mail server, a banking website, a cloud storage server, and the like. Thus, restricted access server 130 can be any computing device, application, or other entity that can be accessed by computing device 110 via vendor application 115 or web browser 116. As noted above, vendor application 115 is configured to facilitate access to and interactions with application server 130. For example, in some embodiments, vendor application 115 enables banking transactions from a bank account associated with application server 130 and a user of computing device 110.

As noted above, in some embodiments, application server 130 stores and/or provides access to sensitive information and/or enables important data and/or financial transactions. As such, interactions with application server 130, particularly online interactions, generally require authentication, and frequently require two-factor authentication. For instance, in some embodiments, a knowledge factor (for example a user-entered personal identification number or passcode) and a possession factor (for example possession of mobile device 120) are employed by application server 130 to approve user access to application server 130 via computing device 110. That is, user access to application server 130 via computing device 110 is not approved unless a two-factor authentication process is successfully completed in which a knowledge factor and a possession factor are verified. Suitable knowledge factors include a user-entered personal identification number (PIN) or passcode/password. In some embodiments, a suitable possession factor is possession of mobile device 120, which is the mobile device activated with a phone number associated with the account being accessed on application server 130. In such embodiments, possession is indicated by electronic confirmation that the user has possession of and user access to mobile device 120, such as a one-time password (OTP) that is sent via text message to mobile device 120. In some embodiments, the current interaction with application server 130 is performed with computing device 110, and in other embodiments, the current interaction with application server 130 is performed with mobile device 120. In either case, possession of mobile device 120 can be employed as a possession factor.

According to various embodiments, an authorization process employs a network ID as a possession factor for a secure account, such as a bank account or e-mail account, and determines one or more risk indicators associated with the possession factor. The authorization process is successfully completed when a risk score that is based on the risk indicators is less than a certain risk threshold. As noted above, the risk indicators include a device history of the network ID and/or at least one attribute of a cellular account associated with the network ID. The device history identifies other mobile devices and/or SIM cards, if any, that have been previously activated with the network ID, while the one or more account attributes can further indicate potentially fraudulent activity associated with the cellular account through which wireless services for the network ID are currently provided. In some embodiments, the above-described authorization process is performed by application server 130. Alternatively, in some embodiments, the above-described authorization process is performed by an external authorization entity (not shown in FIG. 1). The external authorization entity may be, for example, an application that runs on a server or other computing device that is coupled to the Internet (or to another communications network).

Cellular network provider 140 represents one or more computing devices or servers included in a cellular network that are employed by the provider of the cellular network for communicating control, status, and signaling information between nodes in the cellular network. In some embodiments, cellular network provider 140 is included in a Signaling System 7 (SS7) network. In some embodiments, cellular network provider 140 includes the capability of the cellular network to allocate Internet protocol (IP) addresses to mobile device 120 and to map currently allocated IP addresses to the network IDs of mobile device 120. In addition, cellular network provider 140 includes a cellular account database 141 that tracks the attributes of cellular accounts through which wireless services for a plurality of network IDs are currently provided. One embodiment of cellular account database 141 is described below in conjunction with FIG. 2.

FIG. 2 shows cellular account database 141, according to one or more embodiments of the present invention. Typically, each cellular network provider 140 maintains a different cellular account database 141 or equivalent thereof, thus, the cellular account database 141 shown in FIG. 2 tracks attributes of cellular accounts for a single cellular network provider 140. In FIG. 2, cellular account database 141 is represented as a table that includes multiple status entries 220 for each of a plurality of cellular accounts 202, where each cellular account 202 is uniquely associated with a single network ID 201. Thus, for each network ID 201, there is a single cellular account 202 through which wireless services for that network ID 201 are currently provided. For each cellular account 202, cellular account database 141 includes a status entry 220 for each of a plurality of different attributes of that cellular account 202.

Examples of suitable account attributes that can be included in cellular account database 141 include account tenure 203 (i.e., how long the cellular account 202 has been activated), payment status 204 (i.e., whether payment for the cellular account is currently overdue, referred for collection, or up-to-date), account payment type 205 (i.e., whether the cellular account is a pre-paid account or a billed account), pre-paid transition status 206, (i.e., whether and how recently the cellular account 202 has transitioned from a billed account to a pre-paid account), call-forwarding activation 207 (i.e., whether call-forwarding is currently activated for the cellular account 202), call-forwarding recency 208 (i.e., how recently call-forwarding was activated for the cellular account 202), network ID porting status 209 (i.e., whether and how recently the associated network ID 201 has been ported from a different cellular account or cellular provider), and the like. In addition to the above-described account attributes, cellular account database 141 can track the status of any other suitable account attributes that in certain instances can indicate possible fraudulent activity associated with the cellular account 202.

By way of illustration, in FIG. 2 cellular account database 141 only tracks the attributes of eleven cellular accounts 202 and associated network IDs 201. In practice, cellular account database 141 can track the attributes of a very large number of cellular accounts 202.

Typically, a particular cellular account 202 can be activated through one of various cellular network providers 140. As a result, in some embodiments, the account attributes of certain cellular accounts 202 are disposed in a cellular account database 141 for one of cellular network providers 140, while the account attributes of another cellular account 202 are disposed in a cellular account database 141 for a different one of cellular network providers 140. Thus, in such embodiments, to determine the account attributes of a cellular account 202, application server 130 and risk indicator server 150 queries the cellular network provider 140 in which the specific cellular account 202 resides.

Returning to FIG. 1, risk indicator server 150 may be an application that runs on a server or other computing device coupled to the Internet or other communications network, and is configured to execute risk indicator operations as described herein. Such operations can include tracking/updating a device history for each of a plurality of network IDs and providing the appropriate device history to application server 130 or to another suitable authorization entity. Such operations can also include tracking and/or performing a lookup of cellular account status for a plurality of network IDs, for example by querying an appropriate cellular network provider 140. In this way, risk indicator server 150 facilitates authorization of a user activity that employs the network ID of mobile device 120 as an authentication factor by providing applicable risk indicators to application server 130 or to the authorization entity. For example, in some embodiments, risk indicator server 150 maintains a device history database 151 that includes a respective device history for each of a plurality of network IDs. One embodiment of device history database 151 is described below in conjunction with FIG. 3.

FIG. 3 shows device history database 151, according to one or more embodiments of the present invention. In FIG. 3, device history database 151 is represented as a table that includes a different device history for each of a plurality of network IDs 201. As shown, device history database 151 includes a device history 310 for network ID XXX-YYY-ZZZ1, a device history 320 for network ID XXX-YYY-ZZZ2, and a device history 330 for network ID XXX-YYY-ZZZ3. Each device history maps the corresponding network ID 201 to one or more mobile device identifiers (IDs) 302 and an activation date 303 for each such mobile device ID 302. By way of illustration, in FIG. 3 only three device histories 310, 320, and 330 are shown, each corresponding to a specific network ID 201. In practice, device history database 151 can include a different device history for hundreds of thousands or more of network IDs 201.

Each network ID 201 is a mobile number, such as a mobile telephone number that is provided by a cellular network provider 140, and is associated with a single mobile device 120. It is noted that a particular network ID 201 can be ported from one cellular account with one cellular network provider 140 to another cellular account with a different network provider 140 and/or to another mobile device 120. Therefore, each network ID 201 is not permanently and uniquely associated with a particular mobile device 120. As a result, a specific network ID 201 can be associated with various mobile devices 120 (i.e., with various mobile device IDs 302) over time, as shown in FIG. 3.

Each mobile device ID 302 is a unique and non-transferable identifier associated with a particular mobile device 120, such as an international mobile equipment identifier (IMEI). In some embodiments, each activation date 303 indicates a date (or date/time combination) at which a corresponding mobile device ID 302 was associated with the network ID 201. Alternatively or additionally, in some embodiments, each activation date 303 includes a time interval indicated by a start date (or date/time combination) and an end date (or date/time combination). In such embodiments, each time interval indicates when the corresponding mobile device ID 302 was associated with the network ID 201.

In some embodiments, an entry is added to the device history for a particular network ID 201 whenever a new mobile device 120 (as indicated by mobile device ID 302) is activated with the particular network ID 201. In this way, the device history for a particular network ID 201 is updated over time. For example, when a user ports a network ID 201 to a new mobile device 120, a new entry is added to the device history of the ported network ID 201, where the new entry includes the mobile device ID 302 of the new mobile device 120 and the activation date 303 indicates when the new mobile device 120 was activated with the ported network ID 201. In such embodiments, a cellular network provider 140 pushes the new mobile device ID 302 of the new mobile device 120 to risk indicator server 150. Additionally or alternatively, in some embodiments, entries in device history database 151 are updated by risk indicator server 150 periodically through queries to each of cellular network providers 140, for example hourly, daily, or weekly. Additionally or alternatively, in some embodiments, entries in device history database 151 for a particular network ID 201 are updated by risk indicator server 150 when risk indicator server 150 receives a query from application server 130 for the network ID 201 as an authentication factor.

In some embodiments, device histories 310, 320, and 330 further include one or more SIM card IDs 304 and an activation date 305 for each such SIM card ID 304. Each SIM card ID 304 is a unique and non-transferable identifier associated with a particular SIM card, such as an international mobile subscriber identity (IMSI), which is commonly employed by cellular network providers 140 to identify mobile devices in inter-network communications. Each activation date 305 indicates a date (or date/time combination) at which the corresponding SIM card ID 304 was associated with the network ID 201. For example, the activation date 305 for a particular SIM card ID 304 in device history 310 can indicate a date and/or time at which the SIM card associated with that particular SIM card ID 304 was used with the network ID 201 that corresponds to device history 310. That is, the activation date 305 can indicate when a mobile device 120 activated with the network ID that corresponds to device history 310 is detected using a SIM card with the particular SIM card ID 304. In such embodiments, a cellular network provider 140 pushes the new SIM card ID 304 302 of the new mobile device 120 to risk indicator server 150. Thus, when a user changes the SIM card in a mobile device 120, which typically occurs when changing cellular service to a different cellular network provider 140, device history 310 is updated with an entry that includes the SIM card ID 304 and the activation date 305. Thus, in such embodiments, each device history also maps the corresponding network ID 201 to one or more SIM card identifiers 304 and activation dates 305 for each network ID 201.

Figure 4:
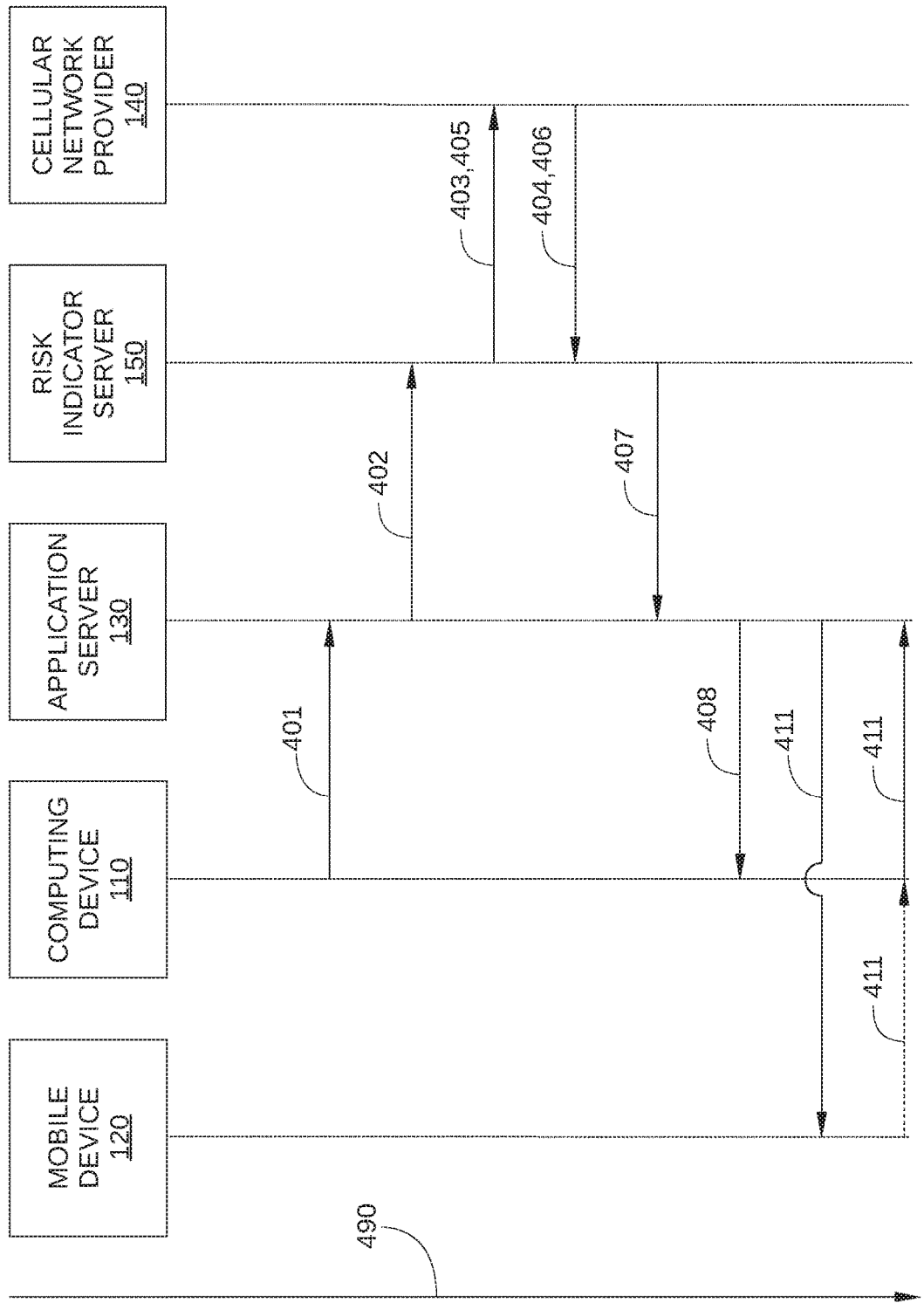
FIG. 4 schematically illustrates the steps performed by the mobile identity verification system of FIG. 1 as the steps occur sequentially along a time line, according to one or more embodiments of the invention.

FIG. 4 schematically illustrates the steps performed by mobile identity verification system 100 as the steps occur sequentially along a time line 490, according to one or more embodiments of the invention. As noted above, when a user attempts to access application server 130 via computing device 110 (or otherwise initiate a sensitive transaction with application server 130), and possession of a mobile device 120 programmed with a network ID is an authentication factor for such an access, mobile identity verification system 100 provides to application server 130 one or more risk indicators for the network ID activated on mobile device 120. Application server 130 can then determine a risk factor associated with the network ID based on the risk indicators determine for the network ID and whether to authorize the access based on the risk factor.

When a user attempts to initiate an online transaction or otherwise interact with application server 130, computing device 110 transmits a login request 401 to application server 130 in order to login or otherwise access application server 130. For example, after a connection is established between computing device 110 and application server 130 via communication network 108, a user may select an icon displayed by computing device 110 to initiate login request 401. The icon may be displayed by, for example, vendor application 115 or web browser 116 running on computing device 110. In embodiments in which the computing device by which the user attempts to interact with application server 130 is mobile device 120, the icon may be displayed by, for example, web browser 126 running on mobile device 120. In some embodiments, the network ID 201 of mobile device 120 is included in login request 401.

Application server 130 then transmits a request for risk indicators 402 to risk indicator server 150 for the network ID 201 activated on the computing device 110 from which login request 401 originated. In embodiments in which login request 401 includes the network ID activated on mobile device 120, application server 130 extracts the network ID from login request 401 in an appropriate procedure. For example, when computing device 110 and mobile device 120 are the same device, cellular network provider 140 may include the network ID in header information of data traffic associated with login request 401. In embodiments in which login request 401 does not explicitly include the network ID activated on mobile device 120, application server 130 can query a cellular network provider 140 associated with communication network 108 for the network ID based on an Internet Protocol (IP) address included in login request 401. Alternatively, in such embodiments, application server 130 can query a mobile device identification server for the network ID based on the IP address included in login request 401. One example of such a mobile device identification server is described in detail in U.S. patent Publication Ser. No. 16/102,624, filed Aug. 13, 2018 and entitled "Mobile Number Verification for Mobile Network-Based Authentication," which is incorporated herein by reference in its entirety.

Upon receipt of request for risk indicators 402 from application server 130, risk indicator server 150 determines one or more risk indicators for the network ID included in request for risk indicators 402, then transmits the appropriate risk indicators 407 to application server 130. One embodiment of the operations of risk indicator server 150 is described below in conjunction with FIG. 5.

Figure 5:
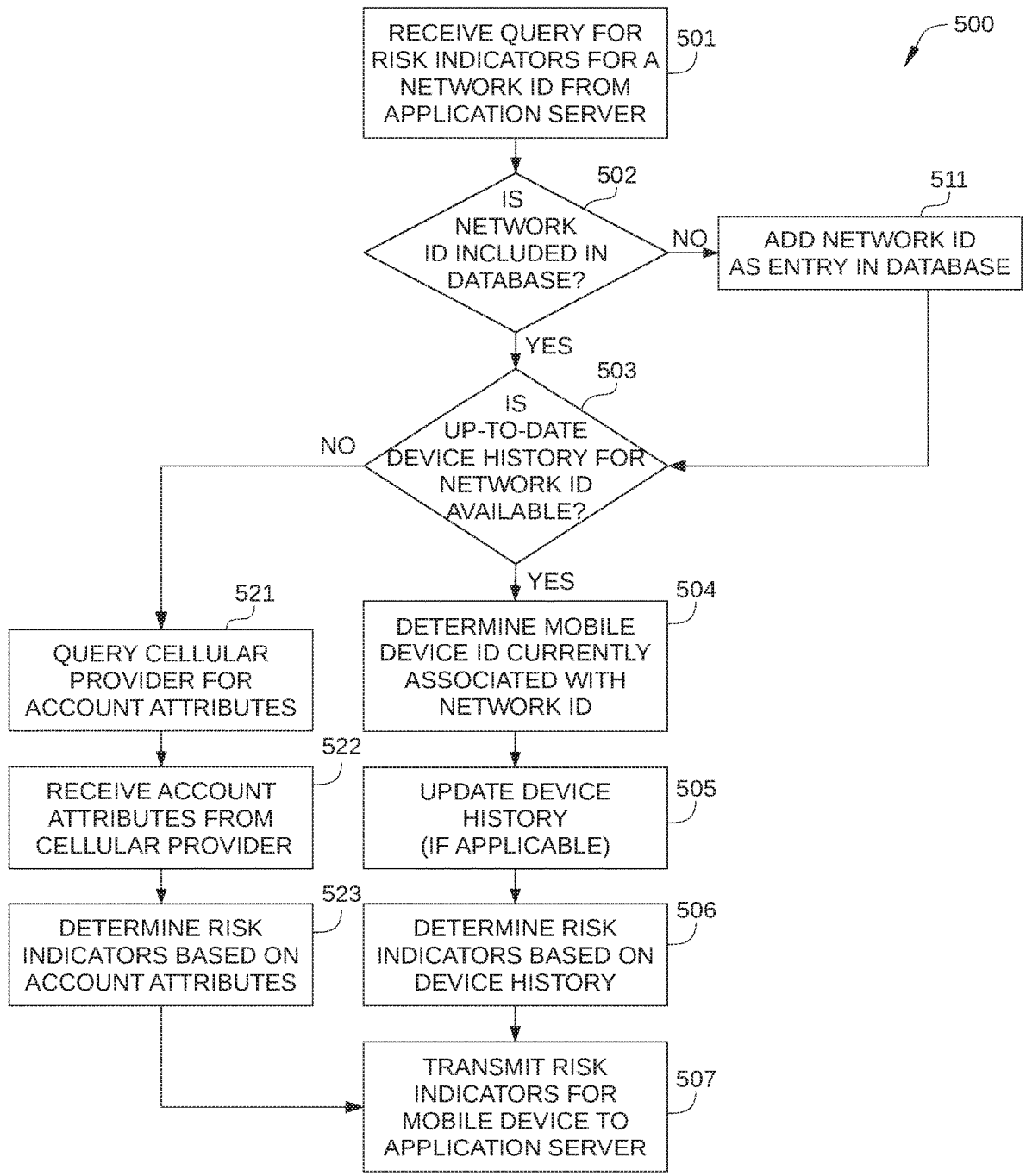
FIG. 5 is a flowchart of method steps for determining risk indicators for a particular network ID and for managing a device history database, according to one or more embodiments of the invention.

FIG. 5 is a flowchart of method steps for determining risk indicators for a particular network ID and for managing device history database 151, according to one or more embodiments of the invention. Although the method steps are described in conjunction with mobile identity verification system 100 of FIG. 1, persons skilled in the art will understand that the method steps may be performed with other suitable mobile identity verification systems.

As shown, a method 500 begins at step 501, where risk indicator server 150 receives request for risk indicators 402 (shown in FIG. 4) for a specified network ID from application server 130.

In step 502, risk indicator server 150 determines whether a device history currently exists in device history database 151 for the network ID in request for risk indicators 402. If yes, method 500 proceeds to step 503; if no, method 500 proceeds to step 511.

In step 503, risk indicator server 150 determines whether currently up-to-date device history information for the network ID associated with login request 401 is available. That is, risk indicator server 150 determines whether device history information for the network ID associated with login request 401 is available that has been updated within a predetermined threshold time interval. Such a threshold time interval is selected to be sufficiently short to facilitate detection of a recent attempt on the part of a fraudster to port or otherwise transfer the network ID to a different mobile device. Because certain cellular network providers 140 update such information almost instantaneously (e.g., on the order of a few minutes), the predetermined threshold time interval can be a relatively short period of time. For example, in some embodiments, the predetermined threshold time interval can be on the order of a few minutes.

In some embodiments, risk indicator server 150 first determines whether entries in device history database 151 for the network ID associated with login request 401 have been updated within a predetermined threshold time interval. If such entries in device history database 151 have been updated within the predetermined threshold time interval, risk indicator server 150 determines that an up-to-date device history is available, step 503 ends, and method 500 proceeds to step 504. Alternatively or additionally, in some embodiments, risk indicator server 150 determines whether currently up-to-date device history information for the network ID associated with login request 401 is available from an appropriate cellular network provider 140. If such up-to-date device history information is available from the cellular network provider 140, risk indicator server 150 determines that an up-to-date device history is available, step 503 ends, and method 500 proceeds to step 504. If no or insufficient up-to-date device history information is available from the cellular network provider 140, risk indicator server 150 determines that an up-to-date device history is not available, step 503 ends, and method 500 proceeds to step 521. It is noted that certain cellular network providers 140 do not update device history information with a frequency that facilitates the use of device history as a reliable risk indicator for a particular network ID 201. For example, if such information is only updated every 72 hours, then a fraudster who successfully ports a victim's network ID to a cellular account 202 controlled by the fraudster has as much as 72 hours to perform fraudulent activity using the victim's network ID without detection via device history. Consequently, attributes of cellular account 202 can be employed to determine risk indicators, as described below in conjunction with step 521-523.

In step 504, risk indicator server 150 determines a mobile device ID of the specified network ID, i.e., the mobile device ID that is currently associated with the specified network ID. As noted, the mobile device ID is a non-transferable identifier associated with a particular mobile device 120, such as the IMEI for that particular mobile device 120. In some embodiments, risk indicator server 150 transmits a mobile device ID query 403 (shown in FIG. 4) to the cellular network provider 140 associated with the specified network ID, then receives mobile device ID information 404 (shown in FIG. 4) from the cellular network provider 140 associated with the specified network ID. Thus, mobile device ID information 404 can include a mobile device ID 202 (shown in FIG. 2). Furthermore, mobile device ID information 404 can include an activation date 203 (shown in FIG. 2) that corresponds to the mobile device ID 202.

In some embodiments, mobile device ID query 403 also includes a request for the SIM card ID for the SIM card currently associated with the mobile device 120 from which login request 401 originated. For example, in some embodiments, the SIM card ID includes the IMSI of the SIM card currently associated with the mobile device 120 that is a possession factor for authorizing login request 401. In such embodiments, the mobile device ID information 404 that risk indicator server 150 receives from the cellular network provider 140 also includes a SIM card ID, such as a SIM card ID 204 in FIG. 2. Furthermore, in such embodiments, the mobile device ID information 404 includes an activation date 205 (shown in FIG. 2) that corresponds to the SIM card ID 204 included in mobile device ID information 404.

In step 505, in response to receiving mobile device ID information 404, risk indicator server 150 updates the device history included in device history database 151 for the specified network ID. More specifically, an entry is added to the appropriate device history, where the added entry includes the mobile device ID 202 and the activation date 203 included in mobile device ID information 404. In some embodiments, the entry that is added also includes the SIM card ID 204 and the activation date 205 included in mobile device ID information 404.

In step 506, risk indicator server 150 determines one or more risk indicators based on the mobile device ID information 404 received in step 504. Any suitable algorithm can be employed to generate the one or more risk indicators. In some embodiments, examples of risk indicators include a recent change from one mobile device ID 302 to another mobile device ID 302 that is associated with the network ID 201; a recent change from one SIM card ID 304 to another SIM card ID 304 that is associated with the network ID 201; a high frequency of changes in mobile device ID 302 and/or SIM card ID 304 associated with the network ID 201, and the like.

In step 507, risk indicator server 150 transmits to application server 130 the risk indicators determined in step 506 and/or 523 for the network ID 201 associated with associated login request 401 as risk indicators 407 (shown in FIG. 4). Thus, the risk indicators 407 transmitted to application server 130 by risk indicator server 150 can include risk indicators based on account attributes of a cellular account 202 associated with the network ID 201 or risk indicators based on an up-to-date device history associated with the network ID 201. Alternatively, in some embodiments, risk indicators 407 can include a combination of risk indicators based on account attributes of the cellular account 202 and on the up-to-date device history associated with the network ID 201. In such embodiments, steps 521-523 (described below) are performed by risk indicator server 150 regardless of whether there is an up-to-date device history available for the network ID 201 of interest.

In step 511, which is performed in response to determining that no device history currently exists for the specified network ID in device history database 151, risk indicator server 150 adds a device history for the specified network ID in device history database 151.

In step 521, which is performed in response to determining that no up-to-date device history currently exists for the specified network ID in device history database 151, risk indicator server 150 queries the appropriate cellular network provider 140 for one or more attributes of the cellular account 202 through which wireless services for the network ID 202 are currently provided. For example, in an embodiment, risk indicator server 150 transmits an account attributes query 405 (shown in FIG. 4) to the appropriate cellular network provider 140.

In step 522, risk indicator server 150 receives account attributes 406 (shown in FIG. 4) from the cellular network provider 140. Generally, account attributes 406 are based on information included in cellular account database 141.

In step 523, risk indicator server 150 determines one or more risk indicators for the network ID 201 of interest based on account attributes 406. For instance, a cellular account 202 that has been recently activated (e.g., within the last 24 hours or 72 hours) is a potential indicator of fraudulent activity, since a fraudster porting a victim's network ID to an account controlled by the fraudster generally involves the activation of a new cellular account 202. In another example, a cellular account 202 that has an overdue payment and/or has been referred for collection can indicate an account that is not intended to be used further, and may be employed by a fraudster in lieu of opening a new account. In another example, a cellular account 202 that is a pre-paid account is a potential indicator of fraudulent activity, since fraudsters typically employ pre-paid accounts when porting a victim's network ID 201 to an account controlled by the fraudster. In another example, a cellular account 202 that has recently transitioned to a being a pre-paid account is a potential indicator of fraudulent activity, since fraudsters typically employ a particular pre-paid account for fraudulent activity for a short time before deactivating the account. In another example, a cellular account 202 that has call-forwarding activated is a potential indicator of fraudulent activity, since fraudsters sometimes employ call-forwarding from a victim's mobile device to a mobile device controlled by the fraudster to intercept an OTP. In another example, a cellular account 202 that has recently had the network ID 201 ported thereto is a potential indicator of fraudulent activity, since fraudsters often attempt to port a victim's network ID to cellular account 202 controlled by the fraudster.

Returning to FIG. 4, application server 130 receives risk indicators 407 from risk indicator server 150 and determines a risk score for the specified network ID 201 based on risk indicators 407. Based on the risk score, application server 130 transmits a login request response 408 to computing device 110, indicating whether or not the requested user activity is authorized. If the risk score is below a predetermined threshold, the user of that computing device 110 can interact with application server 130 normally; if the risk score exceeds the predetermined threshold, application server 130 prevents mobile device 120 from performing the current user activity with respect to application server 130.

Thus, based on the risk indicators that are detected, or on the lack of detected risk indicators, application server 130 determines whether the user activity associated with login request 401 is authorized.

Any suitable risk assessment algorithm may be employed by application server 130 to determine the above-described risk score regarding interactions with application server 130. In some embodiments, a risk assessment algorithm employed by application server 130 is based some or all of the risk indicators included in risk indicators 407.

Alternatively or additionally, in some embodiments, based on risk indicators 407, application server 130 may perform other actions when login request 401 is determined to be an authorized request. For example, in one such embodiment, if the risk score is below a predetermined threshold, application server 130 transmits an OTP 411 or other pass code to the mobile device 120 programmed with the network ID for which risk indicators have been determined. In such embodiments, transmission of OTP 411 enables verification of possession of mobile device 120 by the user requesting the user activity. Specifically, when the user requesting the user activity is in possession of that mobile device 120, the user receives OTP 411 via mobile device 120, and enters OTP 411 in an appropriate manner, for example via a pop-up window or dialogue box displayed by vendor application 115 or web browser 116. OTP 411 is then transmitted to application server 130 by computing device 110. Upon receipt of OTP 411 from computing device 110, the user of computing device 110 can interact with application server 130 normally.

By performing the steps in FIG. 4, mobile identity verification system 100 enhances the security of using a network ID as a possession factor for a particular mobile device 120, since suspicious activity associated with that network ID can be detected prior to authorizing a user activity with that network ID.

In the embodiments described above, risk indicator server 150 maintains and updates device history database 151. Alternatively, in some embodiments, some or all of the information included in device history database 151 of FIG. 1 can be maintained and updated by application server 130. In such embodiments, application server 130 performs some or all of the operations set forth in the flow chart of FIG. 5.

In sum, embodiments described herein enable a network ID of a mobile device to be securely employed as a possession factor. Specifically, when a user attempts to interact with a restricted access server or restricted access account via a computing device, certain risk indicators for the network ID can be determined based on the device history of the network ID with which the mobile device is currently programmed and/or on certain attributes of the cellular account associated with the mobile device. Authentication of the user activity can then be based the risk indicators so determined for the network ID.

While the foregoing is directed to embodiments of the present invention, other and further embodiments of the invention may be devised without departing from the basic scope thereof, and the scope thereof is determined by the claims that follow.

We claim:

1. A computer-implemented method of authorizing a computing device to login to a user account on an application server based on a network identification (ID) activated on a user mobile device, the method comprising:

receiving, by the application server, a request from the computing device to login to the user account, wherein the request from the computing device includes the network ID;

after receiving the request from the computing device, transmitting, by the application server to a risk indicator server, a request for risk indicators associated with the network ID;

receiving, by the application server from the risk indicator server, a first device history and a second device history, wherein the first device history indicates a change in an international mobile equipment identifier (IMEI) associated with the network ID from a first IMEI to a second IMEI, the second device history indicates a change in a subscriber identification module (SIM) card ID associated with the network ID from a first SIM card ID to a second SIM card ID, and the first and second IMEIs and the first and second SIM card IDs correspond to the network ID;

receiving, by the application server from the risk indicator server, one or more attributes of a cellular account to which a cellular network provider provides wireless services for the network ID, wherein the one or more attributes of the cellular account includes at least one of: (1) how long the cellular account has been activated for, (2) whether payment for the cellular account is currently overdue, referred for collection, or up-to-date, (3) whether the cellular account is a pre-paid account or a billed account, (4) whether or how recently the cellular account has transitioned from a billed account to a pre-paid account, (5) whether call-forwarding is currently activated for the cellular account, (6) how recently call-forwarding was activated for the cellular account, and (7) whether or how recently the network ID was ported to the cellular account from another cellular account;

determining, by the application server, a risk score based on the first device history, the second device history, and the one or more attributes of the cellular account; and in response to determining that the risk score is below a threshold, allowing, by the application server, the computing device to login to the user account.

2. The computer-implemented method of claim 1, further comprising determining, by the application server, the network ID from information included in the request from the computing device.

3. The computer-implemented method of claim 1, wherein the first and second SIM card IDs are international mobile subscriber identities (IMSIs).

4. The computer-implemented method of claim 1, wherein the first device history includes a first activation date associated with the first IMEI and a second activation date associated with the second IMEI, and the second device history includes a third activation date associated with the first SIM card ID and a fourth activation date associated with the second SIM card ID.

5. A restricted-access system of computing devices, comprising:

a user mobile device on which a network identification (ID) has been activated; and an application server configured to:

receive a request from a computing device to login to a user account on the application server, wherein the request from the computing device includes the network ID;

upon receiving the request from the computing device, transmit a request to a risk indicator server for risk indicators associated with the network ID, wherein the risk indicators include a first device history that indicates a change in an international mobile equipment identifier (IMEI) associated with the network ID from a first IMEI to a second IMEI, a second device history that indicates a change in a subscriber identification module (SIM) card ID associated with the network ID from a first SIM card ID to a second SIM card ID, and one or more attributes of a cellular account to which a cellular network provider provides wireless services for the network ID, receive, from the risk indicator server, the first device history, the second device history, and the one or more attributes of the cellular account, wherein the first and second IMEIs and the first and second SIM card IDs correspond to the network ID, and wherein the one or more attributes of the cellular account includes at least one of: (1) how long the cellular account has been activated for, (2) whether payment for the cellular account is currently overdue, referred for collection, or up-to-date, (3) whether the cellular account is a pre-paid account or a billed account, (4) whether or how recently the cellular account has transitioned from a billed account to a pre-paid account, (5) whether call-forwarding is currently activated for the cellular account, (6) how recently call-forwarding was activated for the cellular account, and (7) whether or how recently the network ID was ported to the cellular account from another cellular account;

determine a risk score based on the first device history, the second device history, and the one or more attributes of the cellular account, and in response to determining that the risk score is below a threshold, allow the computing device to login to the user account.

6. The restricted-access system of computing devices of claim 5, wherein the risk indicator server is configured to determine the first and second device histories associated with the network ID by:

querying the cellular network provider for the first and second device histories associated with the network ID, and receiving the first and second device histories associated with the network ID from the cellular network provider.

7. The restricted-access system of computing devices of claim 5, wherein the risk indicator server is configured to determine the one or more attributes of the cellular account by:

querying the cellular network provider for the one or more attributes of the cellular account, and receiving the one or more attributes of the cellular account from the cellular network provider.

8. The restricted-access system of computing devices of claim 5, wherein the application server is further configured to determine the network ID from information included in the request from the computing device.

9. The restricted-access system of computing devices of claim 5, wherein the first device history includes a first activation date associated with the first IMEI and a second activation date associated with the second IMEI, and the second device history includes a third activation date associated with the first SIM card ID and a fourth activation date associated with the second SIM card ID.

10. A computer-implemented method of authorizing a computing device to login to a user account on an application server based on a network identification (ID) activated on a user mobile device, the computer-implemented method comprising:

receiving a request from the application server for risk indicators associated with the network ID;

determining that a device history of the network ID in a device history database is not up-to-date, wherein the device history of the network ID includes a first device history that indicates a change in an international mobile equipment identifier (IMEI) associated with the network ID from a first IMEI to a second IMEI and a second device history that indicates a change in a subscriber identification module (SIM) card ID associated with the network ID from a first SIM card ID to a second SIM card ID, and the first and second IMEIs and the first and second SIM card IDs correspond to the network ID;

determining one or more attributes of a cellular account to which a cellular network provider provides wireless services for the network ID, wherein the one or more attributes of the cellular account includes at least one of: (1) how long the cellular account has been activated for, (2) whether payment for the cellular account is currently overdue, referred for collection, or up-to-date, (3) whether the cellular account is a pre-paid account or a billed account, (4) whether or how recently the cellular account has transitioned from a billed account to a pre-paid account, (5) whether call-forwarding is currently activated for the cellular account, (6) how recently call-forwarding was activated for the cellular account, and (7) whether or how recently the network ID was ported to the cellular account from another cellular account; and in response to the request from the application server, transmitting the one or more attributes of the cellular account to the application server, wherein the application server is configured to determine a risk score based on the one or more attributes of the cellular account and, in response to determining that the risk score is below a threshold, allow the computing device to login to log into the user account.

11. The computer-implemented method of claim 10, wherein determining the one or more attributes of the cellular account comprises:

querying the cellular network provider for the one or more attributes of the cellular account; and receiving the one or more attributes of the cellular account from the cellular network provider.

12. The computer-implemented method of claim 10, wherein the first device history includes a first activation date associated with the first IMEI and a second activation date associated with the second IMEI, and the second device history includes a third activation date associated with the first SIM card ID and a fourth activation date associated with the second SIM card ID.

\* \* \* \* \*